INVENTOR
EDWARD GORDON PERRY

BY Samuel M. Mims Jr.
ATTORNEY

INVENTOR
EDWARD GORDON PERRY

BY Samuel M. Mims Jr.

ATTORNEY

PHOTOGRAPHIC SUMMATION SYSTEM
Filed Dec. 26, 1957 4 Sheets-Sheet 3
FIG. 8.
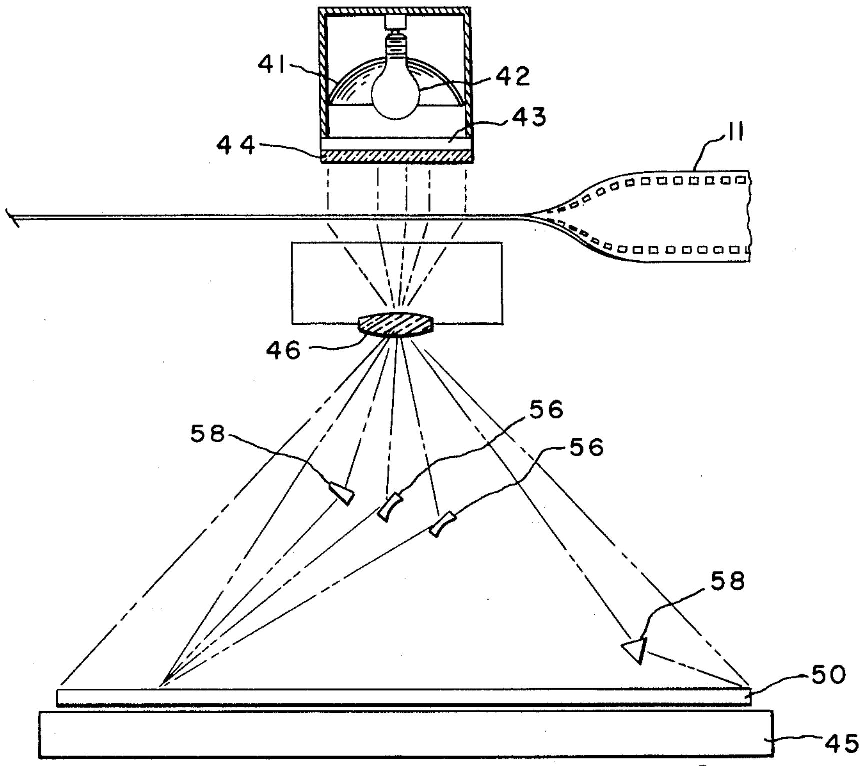
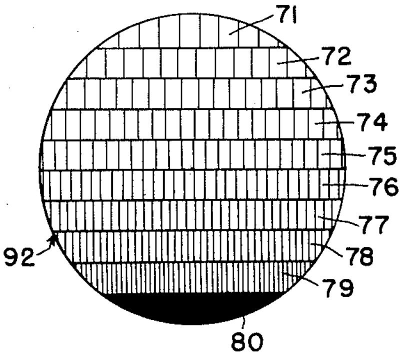
FIG. 10
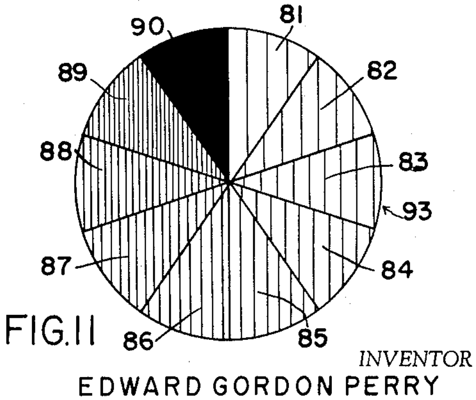
INVENTOR
EDWARD GORDON PERRY
BY Samuel M. Mims Jr.
ATTORNEY

PHOTOGRAPHIC SUMMATION SYSTEM

Filed Dec. 26, 1957 4 Sheets-Sheet 4

INVENTOR
EDWARD GORDON PERRY

BY Samuel M. Mims Jr.

ATTORNEY 3,020,800

PHOTOGRAPHIC SUMMATION SYSTEM

Edward Gordon Perry, Dallas, Tex., assignor, by mesne assignments, to Sperry Rand Corporation, New York, N.Y., a corporation of Delaware Filed Dec. 26, 1957, Ser. No. 705,366
11 Claims. (Cl. 88—24)

This invention relates to a photographic summation system and particularly to a system for visually portraying test results and the like.

It has become quite common in industry to store information relative to inventories, personnel, test results and other data on perforated tapes or cards. When it is desired to decipher the information contained on the tapes or cards, it is necessary to set up a machine which will interpret the particular code used to store the information. This setting up operation is in many instances very time consuming.

The present invention makes it unnecessary to set up such a machine because the device visually presents a desired piece of information represented by a plurality of perforations in the tape or card. Briefly, this is accomplished in the preferred form of the invention by advancing a strip containing the desired information whether it be in the form of a punched length of tape or punched cards beneath a source of light and projecting an image of the strip through a stepped or variable density filter onto a photosensitive material.

The term "strip" is used in this specification to refer either to an indefinite length of tape or to a plurality of cards which are advanced in end to end fashion either contiguously or with only a small amount of space therebetween.

Accordingly, it is an object of the present invention to provide an apparatus in which the tests results may be portrayed visually.

A more particular object of the present invention is to provide an apparatus in which data collected on a punched strip may be revealed by visual inspection.

Another object of the present invention is to provide a summation of data contained on a punched strip by transferral to a photosensitive material.

An additional object of the present invention is to provide an apparatus for progressively exposing a photosensitive material over a wide exposure range.

A still further object of the present invention is to provide a photosummation device that is not hampered by the non-linearity of density as compared to exposure characteristics.

Other objects and advantages of the present invention will become readily apparent upon consideration of the following detailed description when taken in conjunction with the drawings in which:

FIG. 1 is a plan view of a typical tape;

FIG. 1*a* is a plan view of a typical card;

FIG. 8 is a diagrammatic illustration of an optical means for obtaining flexibility in the summation system.

Figures 9, 12:
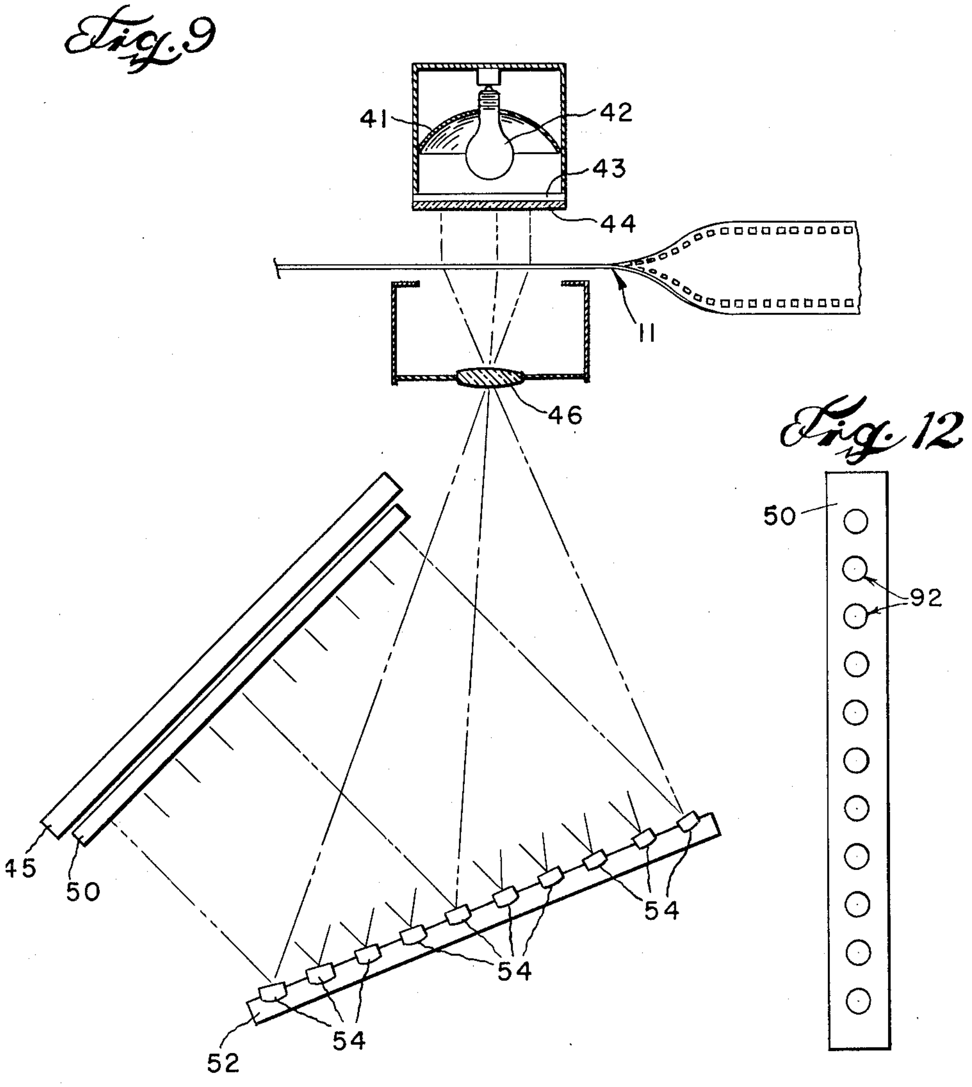
FIG. 9 is a diagrammatic illustration of another optical means for obtaining flexibility in the summation system.

FIGURE 10 discloses a filter element as used in accordance with this invention;

FIGURE 11 is a second type of filter element which is used in accordance with this invention; and FIGURE 12 is a complete filter array structure as used in this invention.

Although not suggested by any prior art, it was first thought that a piece of film could be stationed beneath a strip containing the information desired. Then by advancing the strip one unit of length, the film would be exposed through the holes in the strip. The more frequently a hole appeared in a given column, the darker would be the spot on the film beneath this column. The spot on the film could be inspected by a densitometer which measures the photographic density of development and an approximation of the number of exposures obtained. Since the number of exposures equals the numbers of holes in a column, we have a device for obtaining the summation of holes in a column.

Figure 6:
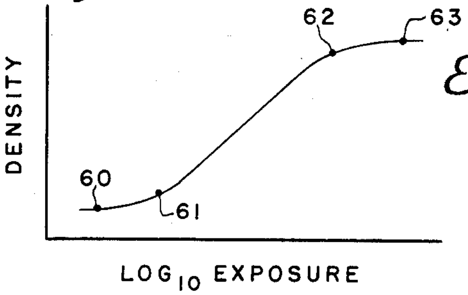
FIG. 6 is a graph of a characteristic curve of density versus the logarithm to the base 10 of exposure.

Even though this is not disclosed by any prior art, there are some problems still present which are overcome in the preferred embodiment of the present invention. For example, the inherent contrast of a film makes it difficult to determine accurately the number of times a given area of a film has been exposed by examining the density of the development. This is true whether or not an instrument such as a densitometer, which measures the photographic density of development, is used. Closely allied with this problem are those of the contrast to which the film is developed, the density to which the film is developed, and the film speed. Even if these are controlled carefully, there is an inherent non-linearity in the density versus exposure curve and, of course, there is a definite limitation to the range of exposure which can be accommodated. If the film is pre-fogged in order to overcome the initial non-linearity, and then not exposed enough to get into the final non-linearity portion of the curve, the range would be considerably more accurate but would also be correspondingly substantially reduced. The pre-fogging operation is one in which, by means of a controlled amount of exposure prior to usage, the film is exposed to the point at which additional exposure falls within the linear portion of a density versus exposure curve such as is shown in FIG. 6, to be described hereinafter.

The present invention effectively overcomes or minimizes these problems and permits coded information either to be read at a glance with the naked eye or to be read quickly by comparison with a standard gray chart which will also be described hereinafter. In frequent applications, the accuracy obtainable from the present invention makes it possible to read coded information without the aid of a densitometer in examining the developed film. However, even when densitometer readings are required to be taken, their accuracy is increased correspondingly by the practice of the present invention.

Figure 1:
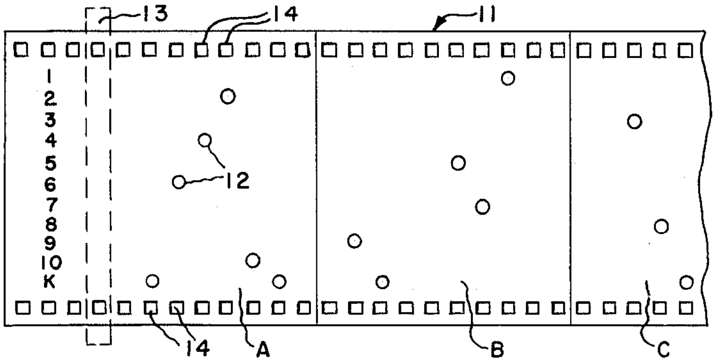
Figure 1A:
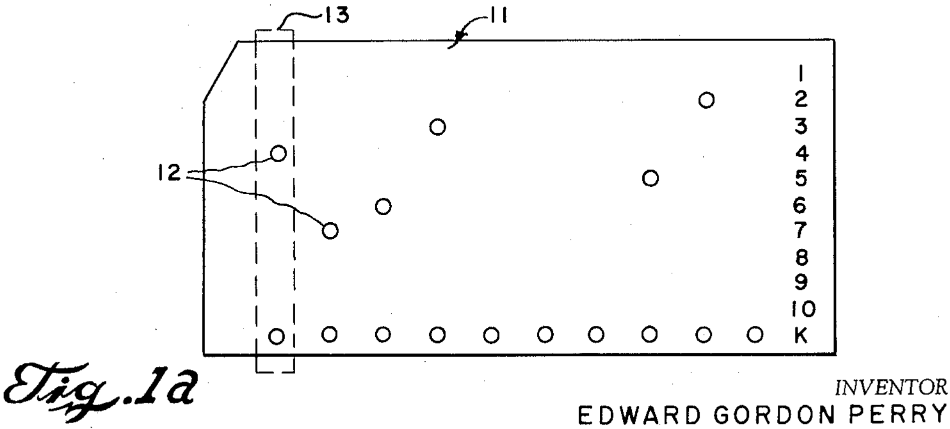

In FIG. 1, a length of tape 11 composed of individual frames A, B, and C, is shown with a plurality of punched holes 12. FIG. 1*a* shows a similarly punched card, also designated by the numeral 11. The columns in which the holes appear are designated 1, 2, 3, 4, 5, 6, 7, 8, 9, 10 and K. Holes 14 assist in feeding the tape 11. The coded information is punched on both the tape and the cards within the numbered columns while the K column is a control column to be described hereinafter. If the ten numbered columns are sufficient to encode the desired information, then a single row of information indicated by dotted rectangle 13 is fed forward per unit time by any suitable feed means (not shown). However, if more than one row is required, any number of rows may be so fed. For example, if fifty places are needed to encode the desired information, then five rows are used and five rows are fed forward per unit time by the feeding mechanism.

When the sum of the columns is desired in addition to the sum of the individual bits of information, the strip 11, which again by assumption, contains fifty bits of information in five rows, may first be fed forward five rows at a time to expose the fifty spots on the film associated with the five rows on which the individual bits of information are encoded. In order to obtain the sum of the columns, the film may be indexed to a position in which only one row of spots is associated with each column of the strip 11 which is then rerun with a suitable mask inserted to expose only one row at a given time as the strip is advanced one row at a time. In this manner, a division of the encoded information into ten subdivisions is possible and the sum of each subdivision may be obtained.

Figure 4:
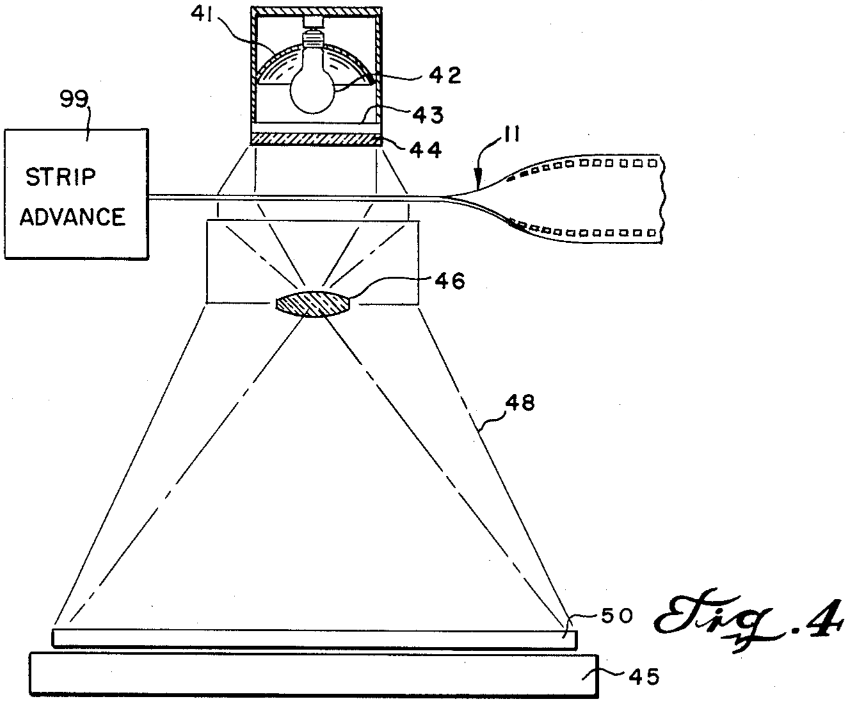
FIG. 4 is a diagrammatic illustration of one optical system to be used in the practice of the present invention.

In FIG. 4, a constant source of light is shown schematically at 42 with an associated diaphragm control 43. A diffusing screen 44 admits the light uniformly to the strip 11 which is intermittently advanced by a strip advancing device 99. Curved reflector 41 helps to provide uniform illumination. An alternative to the intermittent strip feed is to feed the strip 11 at a constant speed and to use an intermittent source of light.

Lens 46 mounted at the apex of hood 48 provides a fixed enlargement for the images of holes 12 and the images of holes 12 are projected through plate 50 to film 45. Plate 50 encases a plurality of stepped neutral density or variable density filters positioned close to the plane of film 45, whereby there is a stepped or variable density filter in plate 50, or multiple filters depending upon the number of rows advanced per unit time, associated with each column of the strip. Each column in the strip 11 thus has an associated spot on the film 45, or as many spots as there are rows advanced per unit time. The stepped filter has several different densities covering the image of each column of holes projected on the film. Thus it is seen that each hole in the strip 11 causes a single exposure of its associated spot on the film 45 positioned beneath its associated stepped or variable density filter. As each series of exposures is being made, the film density will start building up under the least dense portion of the filter first and as that portion of the emulsion approaches the non-linear part of the scale, the image will begin to appear under the next dense portion of the filter and so on in like fashion. As an example, if there are ten areas of different densities in the filter, the total number of exposures can be read to within 10% of the number of such exposures without the use of a densitometer. However, if accuracy requirements make the use of a densitometer mandatory, the readings of the densitometer with ten stops in the filter will be approximately ten times the accuracy of the single density system of recording.

FIGURES 10 to 12 set forth the variable density filter array structure 50 which is used in accordance with this invention. A filter of this type is disclosed in U.S. Patent Number 2,337,534, issued to A. W. Barber. The density of each portion of the filters 92 and 93 increases from 71 to 80 in FIGURE 10 and from 81 to 90 in FIGURE 11. FIGURE 12 sets forth the complete filter array structure 50 including the filters 92 or 93 positioned thereon to correspond to predetermined ones of the punched holes 12 in the card 11.

The K row on the strip 11 contains a preselected number of punches to provide a calibrating standard for the developed spots associated with the individual columns. There may be a plurality of spots in the K row each of which is exposed a known number of times. It may be desirable to expose each of the spots in the K row a different number of times. In this manner it is possible to obtain a standard for comparison with the developed spots associated with the individual columns.

By placing the K row in a position so that it produces a gray scale along the edge of the developed film, it is possible to develop a plurality of identical gray scales so that periodically they may be cut off from the film and moved about for comparison purposes with the developed spot associated with each of the columns. If it were decided to use only a single developed spot in the K row as a calibrating standard, a standard gray scale such as is distributed by producers of film may be used as a comparison for the single developed spot. In this embodiment, the developed spot in the K row is compared with the grayness of the standard gray scale obtained from the film producers to determine how the light intensity, film feed and developing techniques actually used compare with the film producer's gray scale. It is then possible as an alternative to use the film producer's gray scale exclusively as a comparison for the developed spots associated with the individual columns by making allowances for the K row spot being slightly lighter or slightly darker than the film producer's standard.

Two types of scales for the developed spots are contemplated for the present invention. The first is an arithmetic scale and the second is a geometric scale such as a logarithmic scale.

Figure 2:
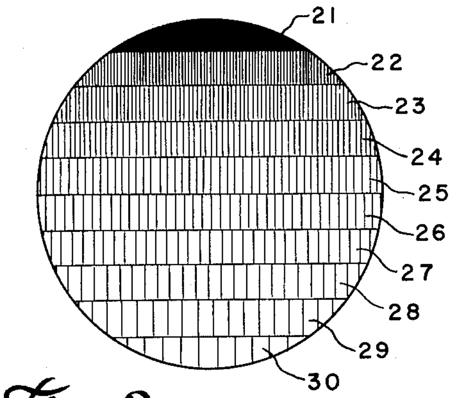
FIG. 2 is a representation of a spot obtained according to one form of the invention.

In FIG. 2 there is disclosed a typically developed spot produced by a stepped filter and illustrating an arithmetic scale. This spot has been exposed through a filter having 10 areas of different density to produce in the spot areas designated by the numbers 21, 22, 23, 24, 25, 26, 27, 28, 29 and 30, the least dense area of the filter producing spot area 21, etc. By comparison with a standard gray scale a reading of approximately 35 is obtained for this spot. This means that the particular column with which this photosensitive spot was associated had approximately 35 holes punched in the length of strip examined.

In using a standard gray scale such as is distributed by producers of film, a decision is first made arbitrarily as to the shade of gray which shall be determinative of the readings made. Once a decision is made, however, it determines the density for each of the filters used. For example, before a reading of the spot in FIG. 2 was possible, a decision to read the area of a grayness lighter than area 23 but darker than area 25 had to be made. A reading of 35 indicates that the grayness of area 24, which gives readings from 30 to 40, is about halfway between the grayness for a reading of 30 and the grayness for a reading of 40. With a little practice, an operator can acquire a considerable amount of skill in making rapid and accurate readings.

Figure 3:
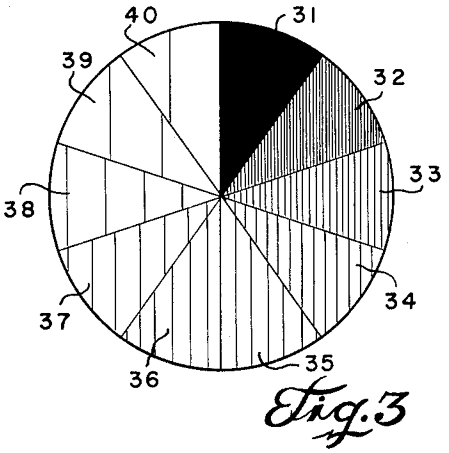
FIG. 3 is a representation of a spot obtained according to a modified form of the invention.

FIG. 3 discloses a corresponding typically developed spot produced by a pie-shaped filter employing a geometric scale. In the development thereof, this spot has had 10 different densities in the pie-shaped filters associated with it in the sectors designated 31, 32, 33, 34, 35, 36, 37, 38, 39 and 40. For the specific embodiment shown in FIG. 3, the filter associated with each of the sectors, beginning with sector 31 and proceeding in numerical order to sector 40, has a density which is twice that of the preceding filter. Thus the filter associated with sector 40 is $(2)^9$ or 512 times the density of the filter associated with the sector 31. This means, for example, that when sector 31 is 100% exposed, sector 32 is 50% exposed, sector 33 is 25% exposed, and so on in like manner. A geometrical scale is preferred over an arithmetical scale since greater contrast between successively exposed areas is possible in the geometrical scale. A reading of sector 33 by comparison with a standard gray scale is approximately 35. Again this means that the column with which this photosensitive spot was associated had approximately 35 holes punched in the length of strips examined.

Reference is now made to FIG. 6 which shows a graph of a characteristic curve of density versus the logarithm to the base 10 of exposure. Between points 61 and 62, density varies in a linear manner with respect to the logarithm of exposure. The region of the curve between the numerals 60 and 61 is the underexposure region commonly referred to as the toe of the characteristic curve. That part of the curve between the numerals 62 and 63 designate the overexposure region of the curve which is commonly referred to as the shoulder of the characteristic curve of density versus the logarithm of exposure. By using a control row with controlled multiple exposures, the filters may be made with a high degree of accuracy to cause a constant amount of development of any given spot on the film for each exposure of that spot. Thus, it is possible to compensate for the non-linear portions of the curve of density versus exposure in making the stepped filters or the pie-shaped filters so that the developed spot indication will appear to the observer to vary linearly with the number of exposures of that spot. It is essential that each successive exposure of a spot of film produces a constant amount of development for that spot of film so that a summation is possible from a visual observation of the developed spot. By making a single exposure in either the underexposure region, the over exposure region or the linear region of the characteristic curve produce a constant amount of development of the film, the total exposure range over which summations may be made is greatly increased. As a matter of fact, the limits may be extended to ranges even beyond those indicated in FIG. 6.

Furthermore, the use of diaphragm control 43, in association with the projection lens 46, permits the range to be expanded beyond that of the already expanded scale. A diaphragm control 43, as is well known in the art, regulates the rate at which exposure of the strip 11 progresses.

Enlarging the image of the holes as they are projected to the spot on the film 45 as disclosed in FIG. 4 makes it possible to read with the naked eye the number of times a given hole appears on the tape and also simplifies the photosummation device itself. Thus, by using ten steps in the filters, it is possible to obtain readings having an accuracy of within 10% of the actual number of times a given hole appears on the tape. When this accuracy will suffice and densitometer readings are not required, photographic paper may be used in place of the film. The paper is both cheaper and easier to handle. Also, the problem of fogging caused by light coming through the paper itself can be taken care of by using blue sensitive film or photographic paper and a blue filtered light source with the paper dyed red or amber color.

Figure 5:
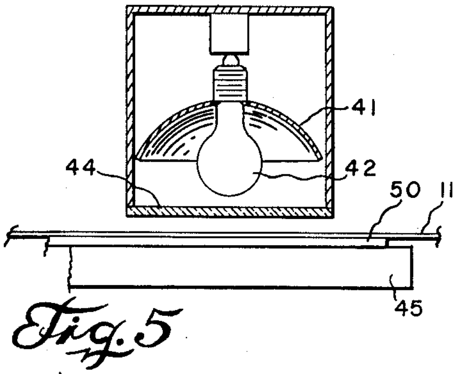
FIG. 5 is a diagrammatic illustration of another optical system to be used in the practice of the present invention.

In FIG. 5 a modified form of the invention is disclosed which eliminates the enlarging system of the preferred embodiment. Thus a contact system is shown in FIG. 5 in which a point source of light 42 provides sufficient illumination through diffusing screen 44 for strip 11 which is in contact with plate 50. As in the preferred embodiment, plate 50 encases stepped neutral density or variable density filters. In this embodiment, film 45 contacts the filters in plate 50. Again each column in the strip has an associated spot or spots on the film.

Figure 7:
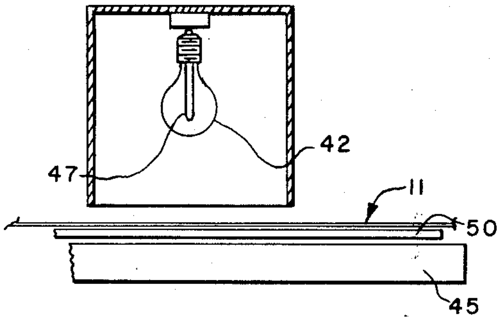
FIG. 7 is a diagrammatic illustration of still another optical system to be used in the practice of the present invention.

A still further modification of the present invention is presented by the arrangement disclosed in FIG. 7. It consists of backing the source of light 42 away from the strip 11 and using a collimating light from a point source to produce an image of the strip 11. It should be noted that the light 42 in this modification is a clear lamp with a small filament 47. Frosted lamps for light 42 are used in all other embodiments of this invention.

In the previous description, it was stated that it was possible to advance a plurality of rows with or without masking all but a single row. The summation may be made more flexible by using some other advancement pattern than any of the patterns previously described. For example, it may be desired to expose simply column number 2 and column number 4, and obtain the individual sums of information contained in these two columns. This may be done by masking all columns except columns 2 and 4. Of course, it is possible also to obtain the sum of information contained in two or more selected columns by running the tape through more than once and repositioning the photographic material so that the same film spot will be successively exposed to the desired columns. Thus a sum of any combination of selected columns may be made.

To make the summation process even easier, it is possible to run the tape through only once and to employ a suitable optical system. FIGS. 8 and 9 show two such optical systems which may be employed. The basic concept here is that the light beam travels through the punched holes and is selectively reflected and/or refracted to produce a desired summation. In FIG. 8 there is shown a plurality of lenses 56 and prisms 58 used either to reflect or refract the light from selected holes in the tape after passing through lens 46 to make the light beams coincide with other light beams at the filter in plate 50. In this manner it is possible to sum selectively any desired positions within any given frame of strip 11 with one pass of the strip. It is also possible to use a two lens system in place of single lens 46 to control the light beams which are directed through the punched holes and use a converging system to reorient the beams en route to the filter in plate 50. When two lenses are employed, the hole positions, the beams from which are being reoriented, must be sufficiently wide apart so that there is physically enough room for two lenses to be substituted for single lens 46. It may be necessary to vary the combination of reflecting lenses, refracting prisms, and the substitution of more than one lens for lens 46 in order to get the desired selection and summation of information.

The simplest form, and the preferred form of optical system for flexible summation, is that shown in FIG. 9. In this system, which will presently be described, a completely flexible summation is obtained. FIG. 9 shows an adjustable mirror mosaic 52. All the beams of light strike the mosaic in the same relatiive position as the beams occupy as they pass through the punched holes. The beams are reflected from the mirrors 54. If there are fifty bits of information in the frame that is being advanced, then fifty mirrors 54 are provided in mirror mosaic 52. Each of the mirrors 54 is universally adjustable so that the beam of light which strikes the mirror may be directed to any one of the filters contained in plate 50 which is shown positioned off to one side and at an angle to the reflected beams of light. This system requires an optical path on the film side of the lens 46 that is long enough so that there is a sufficient spreading of the light beams before the mirrors 54 are contacted. The mirrors 54 may be mounted on small ball joint clamps which may be turned so that the light is swung around to the precise spot on the filter that is desired. The lower part of the optical path is elongated to remove sharp angles. It can be seen that in the system described a completely flexible summation of information is achieved.

Though the present invention has been shown and described in specific embodiments, various changes and modifications obvious to one skilled in the art are within the scope, purpose and intent of this invention.

What is claimed is:

1. In a system for portraying information, the combination comprising an opaque strip defining a plurality of successive portions, said strip containing a plurality of transparent parts representative of information with transparent parts in the same relative position in different portions of said strip representative of the same information, means for advancing said strip, photosensitive means, means for projecting a light image of successive portions of said strip onto said photosensitive means with transparent parts appearing in different portions of said strip and in the same relative position being imaged on the same area of said photosensitive means, means mounted between said strip and said photoesnsitive means for presenting a different density filtering action to different areas of the light passing through each of said transparent parts, and means for reproducing a visual representation of said filtered light impinging on said photosensitive means indicative of the number of times a transparent part appears in a predetermined location.

2. A system as set forth in claim 1 wherein said transparent parts are arranged in rows and columns.

3. A system as set forth in claim 2 wherein said transparent parts are holes punched in said strip.

4. A device as set forth in claim 1 wherein said means mounted between said strip and said photosensitive means is a filter array structure including a plurality of filters.

5. A device as set forth in claim 3 wherein said filter array includes a filter corresponding to each transparent portion in each of said successive portions of said strip.

6. A device as set forth in claim 5 wherein each of said filters comprises a plurality of portions each of said portions interposing a different filtering density between said strip and said photosensitive means.

7. A device as set forth in claim 6 further including holding means for holding said strip.

8. A device as set forth in claim 4 wherein said photosensitive means is a photographic film having a photosensitive emulsion thereon, said film producing a visual representation of the amount of light impinging thereon upon development thereof.

9. A device as set forth in claim 5 wherein said photosensitive means is a photographic film having a photosensitive emulsion thereon, said film producing a visual representation of the amount of light impinging thereon upon development thereof.

10. A device as set forth in claim 6 wherein said photosensitive means is a photographic film having a photosensitive emulsion thereon, said film producing a visual representation of the amount of light impinging thereon upon development thereof.

11. A device as set forth in claim 7 wherein said photosensitive means is a photographic film having a photosensitive emulsion thereon, said film producing a visual representation of the amount of light impinging thereon upon development thereof.

References Cited in the file of this patent

UNITED STATES PATENTS

| | | |
|---|---|---|
| 2,186,138 | Henderson | Jan. 9, 1940 |
| 2,226,167 | Gillon | Dec. 24, 1940 |
| 2,337,534 | Barber | Dec. 28, 1943 |
| 2,390,439 | Johnson | Dec. 4, 1945 |
| 2,697,649 | Roth | Dec. 21, 1954 |
| 2,769,922 | Perry | Nov. 6, 1956 |
| 2,783,678 | Andreas et al. | Mar. 5, 1957 |
| 2,944,735 | Goldstern | July 12, 1960 |

FOREIGN PATENTS

| | | |
|---|---|---|
| 624,637 | Great Britain | June 14, 1949 |